(12) United States Patent
Kaler

(10) Patent No.: US 7,949,758 B2
(45) Date of Patent: May 24, 2011

(54) ELECTRONICALLY NEGOTIATING APPLICATION LAYER PROPERTIES

(75) Inventor: Christopher G. Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 10/371,048

(22) Filed: Feb. 20, 2003

(65) Prior Publication Data

US 2004/0199638 A1    Oct. 7, 2004

(51) Int. Cl.
*G06F 15/16* (2006.01)
*G06F 9/46* (2006.01)
*G06Q 10/00* (2006.01)
*G06Q 40/00* (2006.01)
*G05B 19/418* (2006.01)

(52) U.S. Cl. ............ 709/227; 709/228; 705/1.1; 705/37
(58) Field of Classification Search ................... None
See application file for complete search history.

(56) References Cited

U.S. PATENT DOCUMENTS

| | | | | |
|---|---|---|---|---|
| 5,699,361 | A * | 12/1997 | Ding et al. ................... | 370/431 |
| 5,719,942 | A * | 2/1998 | Aldred et al. ................ | 709/228 |
| 5,742,773 | A * | 4/1998 | Blomfield-Brown et al. ........................... | 709/228 |
| 6,148,290 | A * | 11/2000 | Dan et al. ........................ | 705/1 |
| 6,615,269 | B1 * | 9/2003 | Suumaki et al. .............. | 709/230 |
| 7,069,260 | B2 * | 6/2006 | Yanosy .......................... | 706/47 |
| 2002/0046157 | A1 * | 4/2002 | Solomon ........................ | 705/37 |
| 2002/0176442 | A1 * | 11/2002 | Favichia et al. ............... | 370/465 |
| 2002/0178103 | A1 * | 11/2002 | Dan et al. ....................... | 705/37 |
| 2004/0010596 | A1 * | 1/2004 | Hui ................................ | 709/228 |
| 2004/0122952 | A1 * | 6/2004 | Kistler et al. ................ | 709/227 |
| 2005/0005116 | A1 * | 1/2005 | Kasi et al. ..................... | 713/170 |
| 2007/0208865 | A1 * | 9/2007 | Morris et al. ................. | 709/228 |

OTHER PUBLICATIONS

Kakivaya et al., "SOAP: Simple Object Access Protocol", Nov. 1999, IETF (Internet-Draft).*
"An Application Architecture for Supporting Interactive Bilateral Electronic Negotiations", Michael Rebstock, Electronic Commerce and Web Technologies. Second International Conference, EC-Web 2001. Proceedings [Lecture Notes in Computer Science vol. 2115] pp. 196-205.
"Efficiency and Flexibility of Multi-Attribute Negotiations—The Role of Business Object Frameworks", Michael Rebstock, Falculty of Business Administration and Economics, pp. 742-746, 2001.
DOC.COM: a framework for effective negotiation support in electronic marketplaces; Mareike Schoop, Christoph Quix; Computer Networks vol. 37, No. 2 p. 153-170, 2001.

* cited by examiner

*Primary Examiner* — Hassan Phillips
(74) *Attorney, Agent, or Firm* — Workman Nydegger

(57) ABSTRACT

An initiating application layer and at an initiating message processor identifies offer information for negotiating an application layer agreement such as, for example, the communication properties of a communication channel, with one or more other message processors. The initiating message processor sends a schema-based offer including the offer information to the one or more other message processors. A receiving application layer at a receiving message processor receives the schema-based offer. In response, a receiving application layer at the receiving message processor identifies response information, such as, for example, indicating an acceptance, a rejection or a counter offer to the schema-based offer, for negotiating the application layer agreement. The receiving message processor sends a schema-based response including the response information to the initiating message processor. Negotiations continue until an application layer agreement is reached or until one of the application layers rejects further negotiations.

27 Claims, 5 Drawing Sheets

ELECTRONICALLY NEGOTIATING APPLICATION LAYER PROPERTIES

BACKGROUND OF THE INVENTION

1. The Field of the Invention

The present invention relates to electronic negotiation, and more specifically, to electronically negotiating application layer properties.

2. Background and Relevant Art

Computer networks have enhanced our ability to communicate and access information by allowing one computer or device (hereinafter both referred to as a "computing system") to communicate over a network with another computing system using electronic messages. When transferring an electronic message between computing systems, the electronic message will often pass through a protocol stack that performs operations on the data within the electronic message (e.g., packetizing, routing, flow control). The Open System Interconnect ("OSI") model is an example of a networking framework for implementing a protocol stack.

The OSI model breaks down the operations for transferring an electronic message into seven distinct "layers," each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to higher intermediate layers and then eventually received at the application layer. The application layer, the upper most layer, is responsible for supporting applications and end-user processes. Another layer incorporated by most protocol stacks is the transport layer. An example of a transport layer protocol is the Transmission Control Protocol ("TCP").

Often, when two computing systems desire to communicate with each other, the two computing systems must identify mutually supported communication options that can be used to facilitate the exchange of electronic messages. To identify mutually supported communication options, each computing system typically sends its supported communication options, such as, for example, version numbers, cipher settings, and protocols, to the other computing system. From the exchanged communication options, an intersection of mutually supported communication options can be identified. The communication options included in the identified intersection are then used to configure communication between the two computing systems. For example, if a first computing system indicates support for SSL version 2 and SSL version 3 and a second computing system indicates support for only SSL version 2, SSL version 2 can be viewed as an intersection of mutually supported communication options. SSL version 2 can then be used when transferring electronic messages between the first and second computing systems.

Unfortunately, some computer systems may not indicate all of the communication options they support. Thus, identifying an intersection of mutually supported communication options may not be possible. For example, it may be that the second computing system supports SSL version 2 but does not indicate support for SSL version 2 to the first computing system. Thus, electronic messages are not transferred using SSL version 2 even though both the first and second computing systems support SSL version 2. Further, an identified intersection of mutually supported communication options may not always include the most appropriate communication options. For example, it may be that the second computing system supports both SSL version 2 and SSL version 3 (often considered more secure than SSL version 2) but does not indicate SSL version 3 support to the first computing system. Thus, other computing systems that desire to transfer sensitive personal or financial data to the second computing system may refrain from doing so (or may use the less secure SSL version 2) because it appears that the second computing system does not support SSL version 3.

Further, there are limited, if any, mechanisms, for the other computing systems to negotiate (as opposed to simply identifying an intersection of) communication options that are to be used. Thus, these other computing systems may have no way to cause the second computing system to reveal that it supports SSL version 3. Additionally, identified intersections of communication options are frequently identified at lower layers in a protocol stack. Many application layer processes (in part due to the configuration of protocol stacks) lack the ability to alter functionality at lower layers of a protocol stack. Thus, if an application layer process requests communication options that differ from those identified by lower layers, the application layer process is typically not able to utilize the requested communication options.

For example, an application designer may design an application layer process to utilize particular communication options. However, when a computing system including the application layer process exchanges communication options with another computing system the particular communication options are not identified. Thus, in contradiction to the application designer's desired functionality, the application layer process is prevented from utilizing the particular communications options. This is unfortunate as the application designer is often in a better position to decide the desired communication options for an application layer process.

Further, identified intersections of communication options are typically identified from among communication options exchanged by only two computing systems. Thus, to configure communication options between three or more computing systems multiple intersections may need to be identified. Each intersection can result in different communication options that are in turn used to configure communication between different computing systems. When transferring an electronic message through a computing system, the electronic message may need to be converted for compatibility with different configured communication options. For example, a routing computing system may receive an electronic message, which is securely transferred using SSL version 2, from a sending computing system. To compatibly transfer the electronic message to a receiving computing system, the routing computing device may need to convert the electronic message for secure transfer using SSL version 3. Converting between different communication options is inefficient and consumes resources that would otherwise be available to other components of the routing computing system.

Therefore systems, methods, computer program products, and data structures for electronically negotiating application layer properties would be advantageous.

BRIEF SUMMARY OF THE INVENTION

The foregoing problems with the prior state of the art are overcome by the principles of the present invention, which are directed towards methods, systems, computer program products, and data structures for electronically negotiating application layer properties. An initiating application layer at an initiating message processor identifies offer information that is to be used to electronically negotiate application layer properties with a receiving application layer at a receiving message processor. This can include a first portion of a distributed application at the initiating message processor identifying offer information for negotiating properties of a communication channel with a second portion of the distributed application at the receiving message processor.

The initiating message processor sends a schema-based electronic offer that includes the identified offer information (e.g., via a first routing path having one more intermediary message processors) to the receiving message processor. This can include sending a Simple Object Access Protocol ("SOAP") message that contains eXtensible Markup Language ("XML") instructions defined in accordance with an XML schema. The receiving message processor receives the schema-based electronic offer. It may be that both the initiating message processor and the receiving message processor have access to the same XML schema such that the initiating message processor and receiving message processor similarly interpret offer information defined by the XML schema. The use of schemas allows an application designer to flexibly define (or even re-define) how an offer (or response) is structured without having to redesign portions of the distributed application.

A receiving application layer at the receiving message processor identifies response information that indicates the position of the receiving message processor with respect to the schema-based offer. The receiving application layer can identify response information indicating any number of different positions, such as, for example, counter offer, acceptance, or rejection, with respect to the schema-based offer. The receiving message processor sends a schema-based electronic response that includes the identified response information (e.g., via a second routing path that may or may not be the same as the first routing path) to the initiating message processor.

Based on the schema-based electronic offer, the receiving message processor also determines if negotiations with the initiating message processor should continue. For example, when the receiving message processor sends a schema-based electronic response indicating a counter offer, the receiving message processor may be open to further negotiations. On the other hand, when the receiving message processor sends a schema-based electronic response indicating a rejection, the receiving message processor may not be open to further negotiations.

The initiating message processor receives the schema-based electronic response that includes the response information identified by the receiving application layer. Based on the schema-based electronic response, the initiating message processor determines if further negotiations with the receiving message processor should continue. For example, when the initiating message processor receives schema-based electronic response indicating an acceptance or rejection of the schema-based electronic offer, the initiating message processor may cease negations (e.g., not establish a communication channel). On the other hand, when the receiving message processor sends a schema-based electronic response indicating a counter offer, the receiving message processor may respond to the counter offer. The initiating message processor may send a further schema-based electronic response (to the counter offer) to the receiving message processor. The initiating message processor and receiving message processor can exchange schema-based electronic offers and schema-based electronic responses until an agreement is reached (e.g., until a communication channel established). In some embodiments, three or more message processors exchange schema-based electronic offers and schema-based electronic responses to negotiate application layer properties, such as, for example, properties of an application layer communication channel.

Since negotiations occur at the application layer, a distributed application is not limited to properties that are identified by lower layers in a communication stack. Thus, an application designer can have increased confidence that a distributed application will use the properties desired by the application designer. When an application designer is aware that desired properties are likely to be used (as opposed to being prevented from use by lower layers in a communication stack), the application designed may be encouraged to design distributed applications with more advanced properties.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
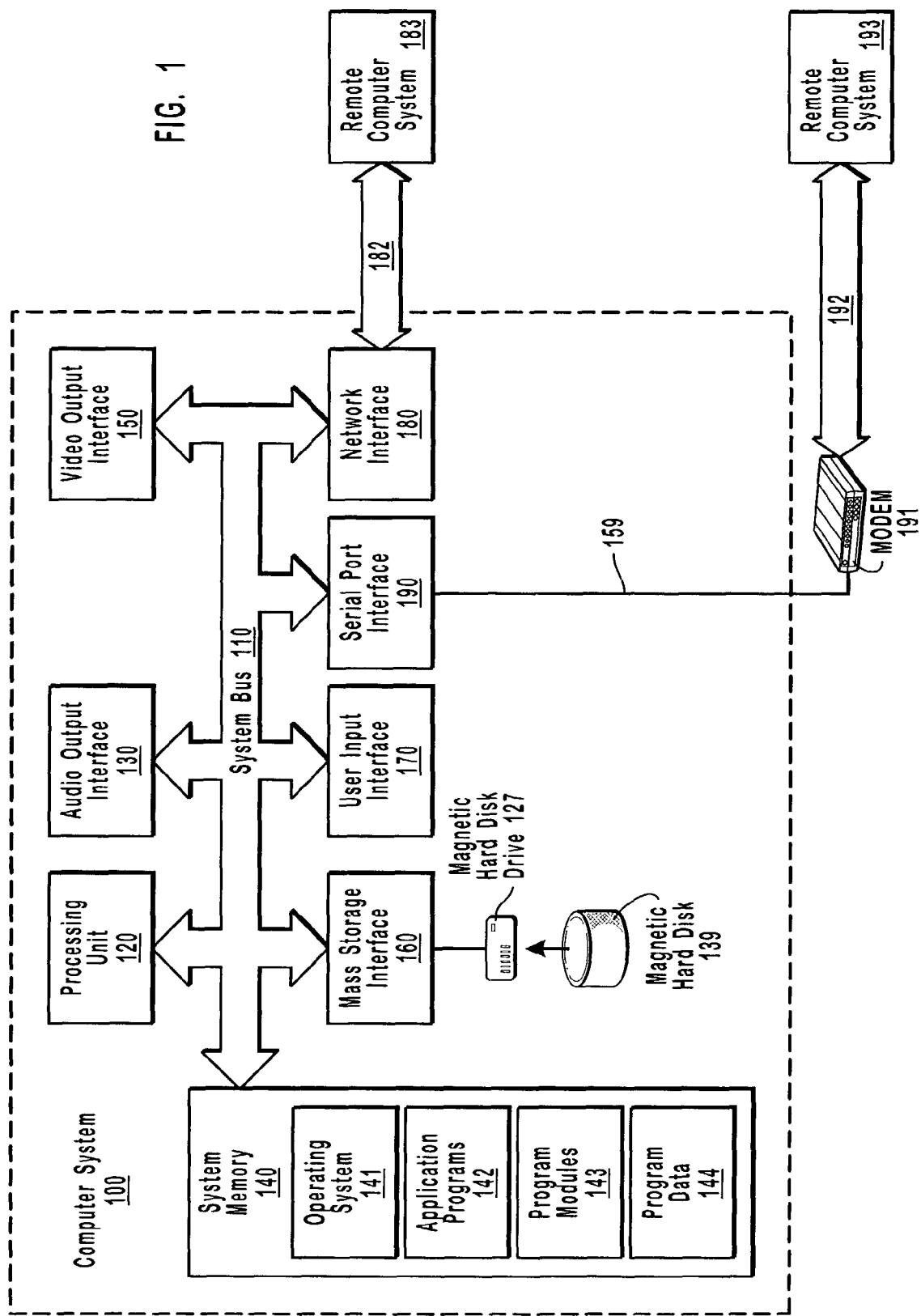
FIG. 1 illustrates a suitable operating environment for the principles of the present invention.

The principles of the present invention provide for electronically negotiating application layer properties. An initiating application layer at an initiating message processor identifies offer information that is to be used to electronically negotiate application layer properties, such as, for example, the properties of a communication channel, with a receiving application layer at a receiving message processor. The initiating message processor sends a schema-based electronic offer including the identified offer information (e.g., along a first routing path through one or more intermediary message processors) to the receiving message processor. The receiving message processor receives the schema-based electronic offer.

The receiving application layer at the receiving message processor identifies response information that indicates a position (e.g., counter offer, acceptance, rejection, etc.) of the receiving message processor with respect to the schema-based electronic offer. The receiving message processor sends a schema-based electronic response that includes the response information (e.g., along a second routing path that may or may not be the same as the first routing path) to the initiating message processor. Based on the schema-based electronic offer, the receiving message processor determines if negotiations should continue.

The initiating message processor receives the schema-based electronic response that includes response information identified by the receiving application layer. Based on the schema-based electronic response (e.g., whether response information indicates counter offer, acceptance, or rejection), the initiating message processor determines if further negotiations with the receiving message processor should continue. The initiating message processor may send a further schema-based response (e.g., to respond to a counter offer) to the receiving message processor. The initiating message processor and receiving message processor can exchange schema-based electronic offers and schema-based electronic responses until an agreement is reached (e.g., the properties of a communication channel are agreed upon). In some embodiments, three or more message processors exchange schema-based electronic offers and schema-based electronic responses to negotiate application layer properties, such as, for example, properties of a common communication channel, that will be used by the three or more message processors.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that enables the transport of electronic data between two entities such as computer systems, message processors, or modules. The actual physical representation of a communication path between two entities is not important and may change over time, such as, for example, when the routing path of an electronic message is changed. A logical communication link may include portions of a system bus, a local area network, a wide area network, the Internet, combinations thereof, or portions of any other path that can facilitate the transport of electronic data. Logical communication links are defined to include hardwired links, wireless links, or a combination of hardwired links and wireless links.

In this description and in the following claims, a "message processor" is defined as one or more modules (hardware and/or software) of a computer system that operate together to perform messaging operations on electronic messages. Messaging operations may include, for example, initiating a message, composing a message, accessing a message, appending information to a message, sending a message, receiving a message, routing a message, removing information from a message, and terminating a message. Any message processor can include the functionality to perform one or more of these messaging operations. It may be that the modules of a message processor are included within a general-purpose computer system, such as, for example, within a laptop or desktop computer system. On the other hand, it may also be that the modules of a message processor exist as a standalone special-purpose computer system, such as, for example, a router.

In this description and in the following claims, "routing" is defined as sending, receiving, and/or determining where to send an electronic message. For example, a sending message processor may initiate an electronic message and include routing information within the electronic message (e.g., in a routing field of the electronic message) that indicates the electronic message is to be routed to a receiving message processor. An intermediary message processor that accesses the electronic message can determine, based on the included routing information, where to route the electronic message.

If appropriate, the intermediary message processor can route the electronic message directly to the receiving message processor. However, it may be that the intermediary message processor is not directly connected to the receiving message processor (or for some other reason can not directly communicate with the receiving message processor). Thus, it may be appropriate for the intermediary message processor to route the electronic message to a second intermediary message processor that is included in a routing path between the sending and receiving message processors. Based on information within an electronic message, an intermediary message processor can also modify routing information (e.g., by changing values in a routing field of an electronic message) included in an electronic message. It may be that a routing field is included along with other fields as part of a data structure associated with an electronic message.

In this description and in the following claims, a "schema" is defined as an expression of a shared vocabulary between a plurality of computer systems and/or a plurality of message processors that allows the plurality of computer systems and/or the plurality of message processors to process documents according the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system or message processor that can access an XML schema can process XML documents in accordance with the XML schema. Further, any computer system or message processor that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actually file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema. In this definition and the following claims, "schema-based" refers to being defined by and/or in accordance with a schema.

In this description and in the following claims, "offer information" is defined generally to include any information that indicates an offer to establish mutual application layer properties, such as, for example, communication properties of a communication channel, between message processors. For example, an initiating message processor may send offer information to a receiving message processor indicating desired communication properties for configuring a communication channel. In this description and in the following claims, "response information" is defined generally to include any information that indicates a response (e.g., counter offer, acceptance, rejection, etc.) to an offer to establish mutual application layer properties, such as, for example, a response to an offer a communication channel with particular communication properties. For example, the receiving message processor may send response information to the initiating message processor indicating acceptance of desired communication properties included in offer information.

Offer information and response information can be included in electronic messages (potentially along with distributed application data) that are transferred between message processors. It should be understood that an electronic message can include both offer information and response information. For example, a message processor may compose an electronic message that rejects one portion of a first offer, accepts another portion of the first offer, and proposes a second offer. It may be that during a negotiation some information is viewed as both offer information and response information. For example, when responding to an offer with a counter offer, information associated with the counter offer can be viewed as both offer information (e.g., information that indicates an offer to establish a communication channel) and response information (e.g., information that indicates a response to an offer to establish a communication channel).

In this description and the following claims, a "communications stack" is defined as a plurality of communication layers, including at least an application layer and one lower layer that is below the application layer, that interoperate to transfer data between message processors. Communication stack is defined to include protocol stacks based around the Open Systems Interconnection ("OSI") networking framework for implementing protocols, including protocol stacks that incorporate the functionality of a plurality of OSI layers in a single layer. Communications stack is further defined to include any protocol stacks implementing the Transmission Control Protocol ("TCP") and/or the Internet Protocol ("IP").

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 includes video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110 which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules, and other data for computer system 100. For example, magnetic hard disk 139 can store one or more program modules including operating system 141, application programs 142, other program modules 143, and program data 144.

Computer system 100 is connectable to networks, such as, for example, an office-wide or enterprise-wide computer network, an intranet, and/or the Internet. Computer system 100 can exchange data with external sources, such as, for example, remote computer systems, remote message processors, and/or remote databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 may be an initiating message processor or receiving message processor that is desirous of establishing a communication channel with computer system 100.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 may be an initiating message processor or receiving message processor that is desirous of establishing a communication channel with computer system 100.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules, distributed applications, and communication stacks as well as associated data, including electronic messages, offer information, response information, and schemas may be stored and accessed from any of the computer-readable media associated with computer system 100. For example, portions of such modules and portions of associated program data may be included in operating system 141, application programs 142, program modules 143 and/or program date 144, for storage in system memory 140.

When a mass storage device, such as, for example, magnetic hard disk 139, is coupled to computer system 100, such modules and associated program data may also be stored in the mass storage device. In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

It should be understood that the principles of the present invention can be implemented to electronically negotiate virtually any type of application layer properties. For example, the principles of the present invention can be implemented to negotiate identity-based properties (e.g., giving premium status customers access to additional application features), message processor based properties (e.g., giving advanced features to message processors with increased processor capabilities), or time based properties (e.g., providing customer server numbers during weekdays but not during weekends). However, in order to simplify the description and with the understanding that the described embodiments could be implemented for any type of application layer property, the principles of present invention will be discussed with respect to negotiating communication channel properties.

Figure 2:
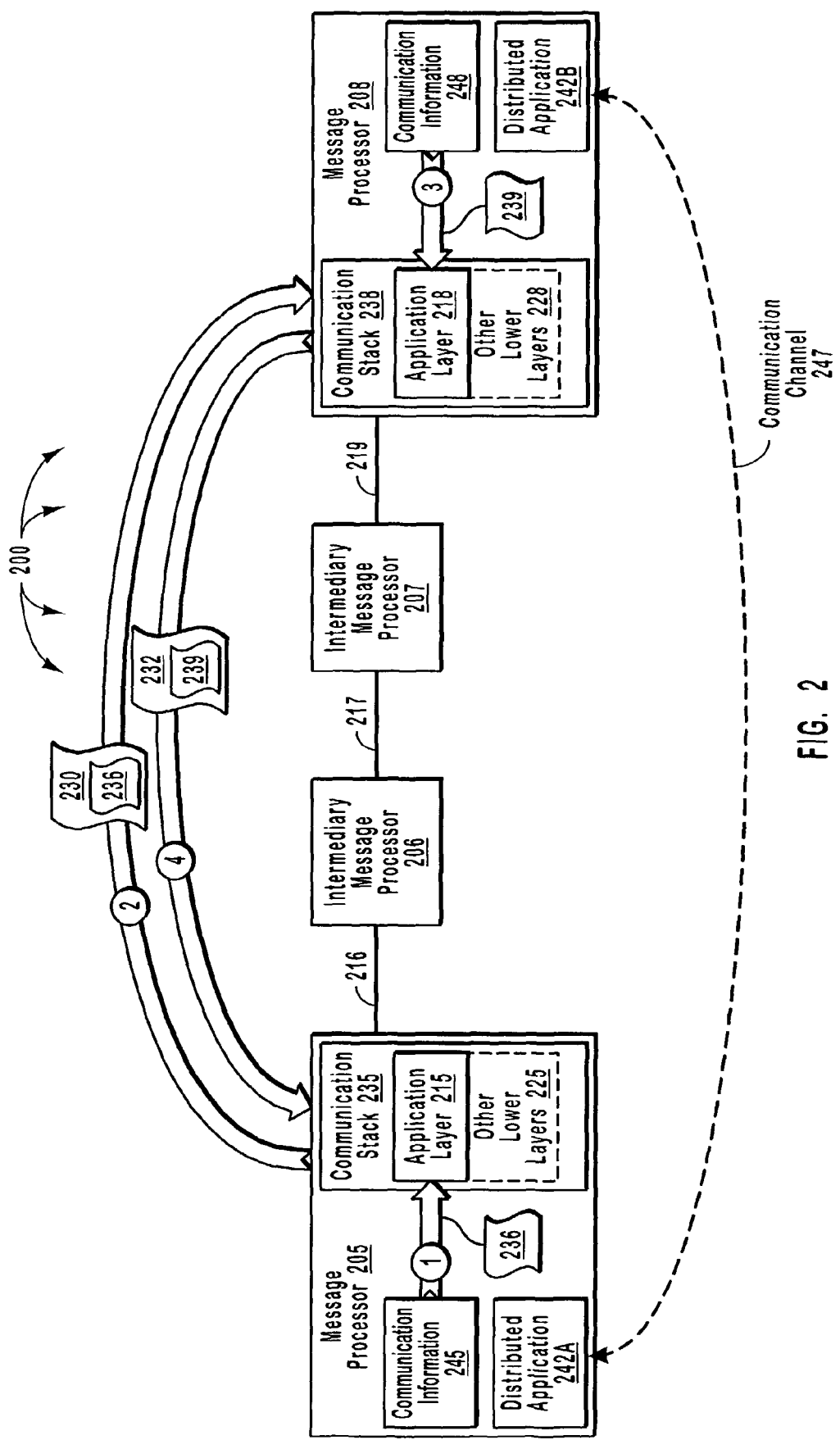
FIG. 2 illustrates an example of a network architecture that can facilitate electronically negotiating communication properties of a communication channel.

FIG. 2 illustrates an example of network architecture 200 that can facilitate the electronic negotiation of communication properties of a communication channel. As depicted in FIG. 2, two electronic messages (electronic messages 230 and 232) are transferred to electronically negotiate the properties of a communication channel. However, it should be understood that the number of messages (as well as offer information and response information contained in the messages) for electronically negotiating the properties of a communication channel is arbitrary and can vary based on previously exchanged offer information and response information. As a result, the properties of a communication channel can be electronically negotiated in any environment where at least two electronic messages are transferred.

Depicted in network architecture 200 are message processor 205, intermediary message processors 206 and 207, and message processor 208. Corresponding logical communication links 216, 217, and 219 connect the message processors depicted in network architecture 200. Message processors 205 and 208 each include a corresponding communication stack (communication stacks 235 and 238) that can facilitate the transfer of electronic messages.

Message processors depicted in network architecture 200 can initiate electronic messages and route electronic messages to (or through) other messages processors within network architecture 200 or other message processes external to network architecture 200 (not shown). For example, message processor 205 may initiate electronic message 230 that is routed through intermediary message processors 206 and 207 and received at message processor 208. However, message 230 can be routed along virtually any routing path, such as, for example, through one or more of the other message processors external to network architecture 200. Similarly, message processor 208 can initiate electronic message 232 that is routed (along the same or a different routing path from which message 230 was routed) to message processor 205.

Figure 3:
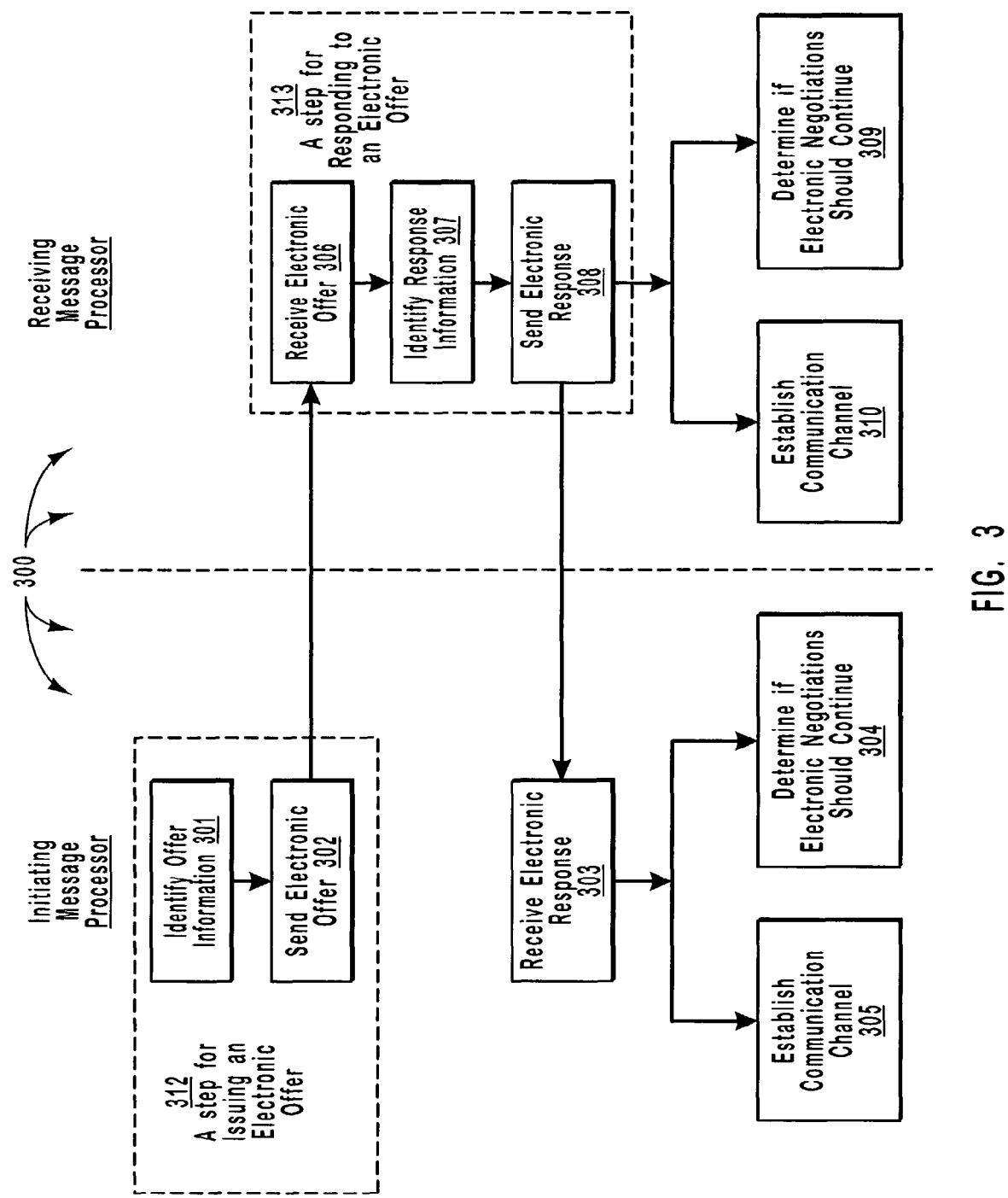
FIG. 3 illustrates an example flowchart of a method for electronically negotiating communication properties of a communication channel.

FIG. 3 illustrates a flowchart of a method 300 for electronically negotiating communication properties of a communication channel. The method 300 will be described with respect to the message processors depicted in network architecture 200.

Method 300 includes a functional result-oriented step for issuing an electronic offer (step 312). Step 312 may include any corresponding acts for accomplishing the result of issuing an electronic offer. However, in the illustrated example of FIG. 3, the step 312 includes a corresponding act of identifying offer information (act 301). Act 301 can include an initiating application layer at an initiating message processor identifying offer information that is to be used to electronically negotiate properties of a communication channel. For example, as illustrated by Arrow 1 in FIG. 2, application layer 215 identifies offer information 236 from within communication information 245.

Communication information 245 can include a database, for example, of communication properties supported by message processor 205. Communication information 245 can also include specified rules that control the terms of an offer, such as, for example, varying communication properties included in offer information based the content that is to be transferred. Specified rules included in communication information 245 can be applied to a database included in communication information 245 to identify offer information 236, which may be a subset of data from the database. Based on desired functionality (e.g., protocols, packet format, security properties, encryption, authentication, reliable messaging properties, transactional properties, language properties, timeout properties, etc.), identified offer information can be used to configure communication channels with a wide variety of different communication properties.

It may be that application layer 215 identifies offer information 236 in response to a module at message processor 205 indicating a desire to establish a communication channel with a module at message processor 208. For example, offer information 236 may be identified in response to distributed application 242A (a first portion of a distributed application) indicating a desire to establish a communication channel with distributed application 242B (a second portion of a distributed application). It may also be that application layer 215 identifies offer information 236 in response to a module at message processor 208 requesting an electronic offer from a module at message processor 205. For example, offer information 236 may be identified in response to distributed application 242A receiving a request (e.g., to establish a communication channel) from distributed application 242B.

Step 312 also includes a corresponding act of sending an electronic offer (act 302). Act 302 can include sending a schema-based electronic offer that includes the identified offer information. For example, as illustrated by Arrow 2 in FIG. 2, message processor 205 sends electronic message 230, which includes offer information 236, to message processor 208. Message processor 205 can compose electronic message 230 to include offer information 236 as well as other information for electronically negotiating properties of a communication channel with message processor 208. The routing path of electronic message 230 can be configured based on desired functionality (e.g., by varying the values of routing fields).

Based on network conditions a routing path may dynamically change. For example, intermediary message processor 207 may receive electronic message 230 that is to be delivered to message processor 208. If communication over logical communication link 219 is for some reason unavailable, intermediary message processor 207 can re-route electronic message 230 along an alternate routing path for delivery to message processor 208. Intermediary message processor 207 may change values in a routing field of electronic message 230 to facilitate re-routing.

Message processor 205 may also compose electronic message 230 to include other types of information not related to the establishment of a communication channel. If appropriate, these other types of information can be included along with offer information 236 within electronic message 230. This may conserve message processor resources and network bandwidth by reducing the overhead associated with composing and transferring a separate electronic message to contain the other types of information. In some embodiments, other types of information can be included along with offer information (or response information) within a data structure.

Figure 4:
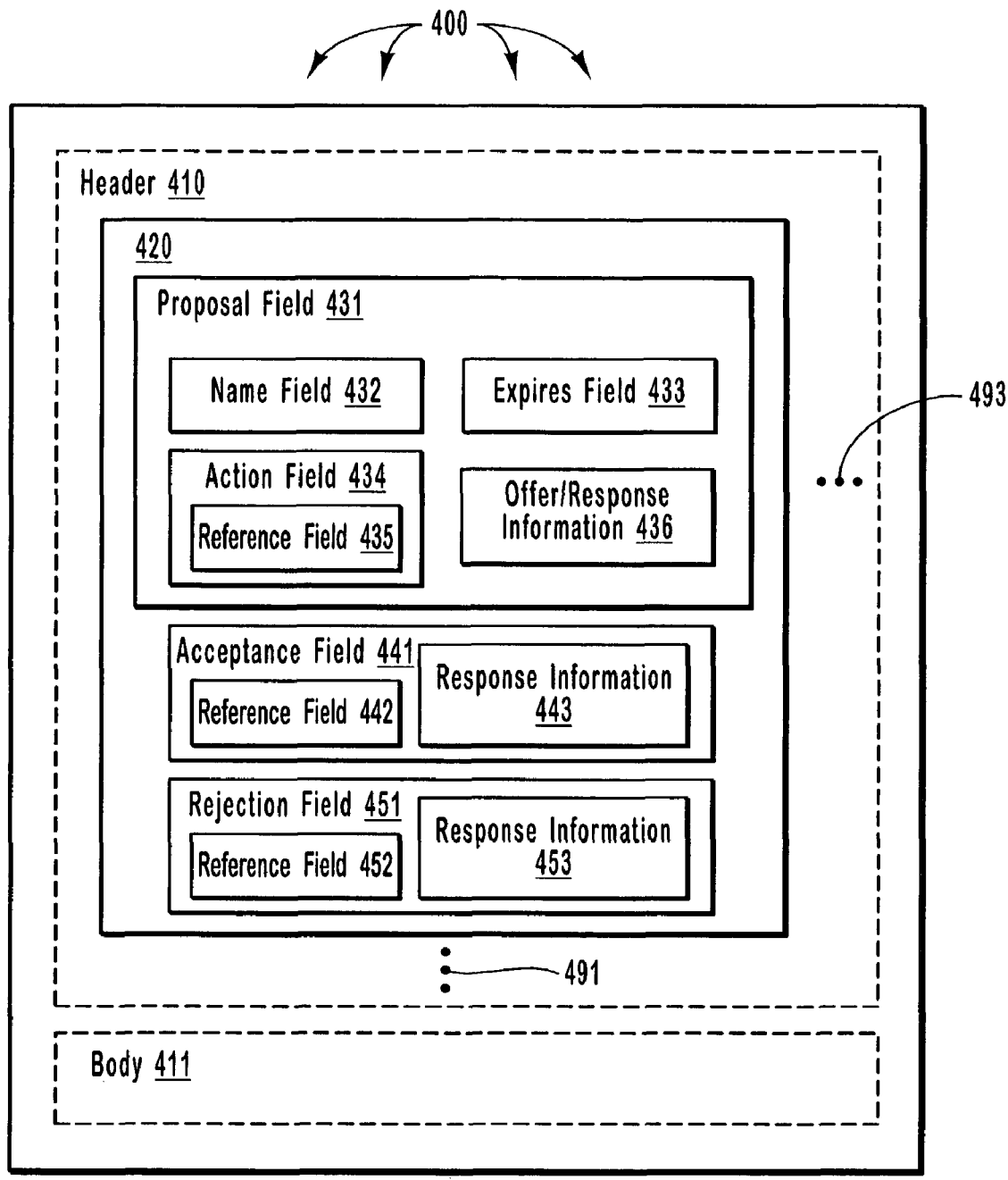
FIG. 4 illustrates an example of a message that can be used to electronically negotiate communication properties of a communication channel.

Depicted in FIG. 4 is an example electronic message 400. Electronic message 400 is an example of one format of electronic message that can be used when implementing the principles of the present invention. Either of electronic messages 230 and 232 can be of a format similar to electronic message 400. Electronic message 400 includes header 410 and body 411. Generally, header data included in header 410 determines how the body 411 is to be processed. Some of the fields in message 400 can represent name-value pairs, such as, for example, an attribute and a corresponding attribute value.

In the example electronic message 400, header 410 includes negotiation header 420, which further includes proposal field 431, acceptance field 441, and rejection field 451. Proposal field 431 represents a proposal (e.g., an offer or a counter offer). Proposal field 431 further includes name field 432, expires field 433, action field 434, and offer/response information 436.

Name field 432 represents a descriptive name that has been given to the proposal represented in proposal field 431. Expires field 433 represents a date and/or time after which the proposal represented in proposal field 431 expires and may no longer be valid. Action field 434 represents an action, such as, for example, augmentation or replacement, associated with the proposal represented in proposal field 431. For example, action field 434 can be used to indicate that the proposal represented in proposal field 431 is to replace or augment another proposal. Reference field 435 represents a reference (e.g., name, pointer, network address, Uniform Resource Identifier ("URI"), etc.) to the proposal that is to be replaced with or augmented by the proposal represented in proposal field 431. Offer/Response Information 436 represents the terms of the proposal represented in proposal field 431. The terms represented by offer/response information 436 can be used to replace or augment the terms of the proposal referenced by reference field 435.

Acceptance field 441 represents an acceptance of at least a portion of a proposal. Acceptance field 441 further includes reference field 442 and response information 443. Reference field 442 represents a reference to a proposal and response information 443 represents an indication of at least a portion of the referenced proposal that is accepted. Response information 443 can include an indication that different portions of the referenced proposal are accepted. For example, when a proposal offers a particular protocol, encryption, and packet format, response information 443 may include an indication that only the protocol and encryption are accepted. When a referenced proposal is accepted in full, response information 443 may be omitted.

Rejection field 451 represents a rejection of at least a portion of a proposal. Rejection field 451 further includes reference field 452 and response information 453. Reference field 452 represents a reference to a proposal and response information 453 represents an indication of at least a portion of the referenced proposal that is rejected. Response information 453 can include an indication that different portions of the referenced proposal are rejected. For example, when a proposal offers a particular protocol, encryption, and packet format, response information 453 may include an indication that the encryption and packet format are rejected. When a proposal is rejected in full, response information 453 may be omitted.

Ellipsis 493 and vertical ellipsis 491 illustrate that other proposal fields, acceptance fields, and/or rejection fields can be included within negotiation header 420. Although a single negotiation header (negotiation header 420) is illustrated within header 410, it should be understood other negotiation headers could also be included. When other types of information are included along with proposals, acceptances, and/or rejections in an electronic message, the other types of information can be included within header 410 and/or body 411.

In some embodiments, at least some of the fields depicted as being included in negotiation header 420 (e.g., acceptance field 441) are instead included in body 411. Thus, in these embodiments, some of the fields depicted as being included in negotiation header 420 are included in header 410, while other of the fields are included in body 411. Alternately in these embodiments, all of the fields depicted as being included in negotiation header 420 are included in body 411.

It should be understood that the present invention is not limited to messaging using any specific transport protocol and format. However, one example protocol that may be used to implement the principles of the present invention is called Simple Object Access Protocol ("SOAP"). Electronic message 230 may be a SOAP message that uses any number of lower level protocols, such as, for example, HyperText Transfer Protocol ("HTTP") or Direct Internet Message Encapsulation ("DIME") as a transport. In some embodiments, negotiation header 420 can be a data structure that is included within a SOAP envelope with header 410 being the header field of the SOAP envelope, and with body 411 being the body of the SOAP envelope.

The following represents an example XML offer element that may be included in the header and/or body of a SOAP envelope for representing an offer:

```
1.   <Offer Name = "..." Expires = "...">
2.       <Replaces Ref = "..."/>
3.       <Augments Ref = "..."/>
4.       <Reference Type = "..." Ref = "..."/>
5.       OFFER INFORMATION
6.   </Offer>
```

The sub-elements within the example XML offer element (between <Offer> and </Offer>) can include one more free-form XML documents. Likewise, the sub-elements within the example XML offer element can include one more XML documents that are defined in accordance with an XML schema accessible to the message processors depicted in network architecture 200. The use of schemas allows an application designer to flexibly define (or even re-define) how an offer is structured without having to redesign portions of a distributed application.

The example XML offer element includes a "Replaces" sub-element, an "Augments" sub-element, and a "Reference" sub-element. However, inclusion of all of these sub-elements within a SOAP envelope (or any other electronic message) is optional. These sub-elements are included to illustrate one example of some of the elements that can be used to implement the principles of the present invention. Depending on the desired functionality one, some, or all of these sub-elements, can be included in an electronic message. Further, it would be apparent to one skilled in the art, after having reviewed this description, that a wide variety of other sub-elements, in addition to the illustrated sub-elements, can be used to implement the principles of the present invention. For example, sub-elements representing any of the fields of electronic message 400 can be included in an XML element.

Attributes in the example XML offer element can be part of a name-value pair, such as, for example, a name attribute and a corresponding name attribute value. Where an ellipsis appears, this indicates that attribute values corresponding to attributes can also be included in the example XML offer element. The example XML offer element includes a "Name" attribute (at line 1), which can be used to represent a descriptive name for the offer. A corresponding Name attribute value can include, for example, a textual name, a reference to a network address, or a Uniform Resource Identifier ("URI").

The example XML offer element also includes an "Expires" attribute, which can be used to represent a date and/or time after which the offer expires. A corresponding Expires attribute value can include absolute time values (e.g., 13:04:04 or 1:04:04 PM) and/or relative time values (e.g., within 5 minutes of offer creation). A corresponding Expires attribute value can also include time values represented using virtually any type of units, such as, for example, months, days, hours, minutes, seconds, milliseconds, microseconds, etc. Thus, it may be that a corresponding Expires attribute value also includes values associated with a date, such as, for example, a day of the week (Monday, Tuesday, etc.), a month (March, April, etc.) or a year (2002, 2003, etc.).

The Replaces sub-element (line 2) is an example of a sub-element that can be used to indicate that the Offer Information at line 5 is to replace other offer information referenced by the "Ref" attribute. A corresponding Ref attribute value can include a reference, such as, for example, a name, a pointer, a network address, or a URI, that is used to locate the other offer information that is to be replaced.

The Augments sub-element (line 3) is an example of a sub-element that can be used to indicate that the Offer Information at line 5 is to augment other offer information referenced by the "Ref" attribute. A corresponding Ref attribute value can include a reference that is used to locate the other offer information that is to be augmented.

The Reference sub-element (line 4) is an example of a user-defined sub-element that can be used to define a specified relationship between the Offer Information at line 5 and other offer information referenced by the "Ref" attribute. A corresponding Ref attribute value can include a reference that is used to locate the other offer information. The "Type" attribute can be used to indicate the type of specified relationship, such as, for example, replacing a first portion of the offer information and augmenting a second portion of the other offer information. A corresponding Type attribute value can be an identifier (e.g., a name, a number, etc.) that identifies a type of specified relationship.

Offer Information at line 5 can be offer information (e.g., offer information 236) that was identified by a message processor (e.g., message processor 205) for the purpose of electronically negotiating the properties of a communication channel with another message processor (e.g., message processor 208). Offer information can be structured in accordance with an XML schema.

The method 300 includes a functional result-oriented step for responding to an electronic offer (step 313). Step 313 can include any corresponding acts for accomplishing the result of responding to an electronic offer. However, in the illustrated example of FIG. 3, the step 313 includes a corresponding act of receiving an electronic offer (act 306). Act 306 can include receiving a schema-based electronic offer that includes offer information identified by an initiating application layer at an initiating message processor. For example, as illustrated by Arrow 2 in FIG. 2, message processor 208 receives electronic message 230, which includes offer information 236, from message processor 205.

Step 313 also includes a corresponding act of identifying response information (act 307). Act 307 can include a receiving application layer at a receiving message processor identifying response information that is to be used to electronically negotiate properties for a communication channel. For example, as illustrated by Arrow 3 in FIG. 2, application layer 218 identifies response information 239 from within communication information 248.

Similar to communication information 245, communication information 248 can include a database, for example, of communication properties supported by message processor 208. Communication information 248 can also include specified rules that control the terms of a response, such as, for example, responding to trusted message processors differently then non-trusted message processors. Specified rules included in communication information 248 can be applied to a database included in communication information 248 to identify response information 239, which may be a subset of the data included in the database. Based on desired functionality (e.g., protocols, packet format, security options, encryption, authentication, etc.), identified offer information can be used to configure communication channels with a wide variety of different properties.

It may be that application layer 218 identifies response information 239 in response to a module at message processor 205 pushing an electronic offer to message processor 208 without message processor 208 (or a user of message processor 208) requesting the electronic offer. For example, response information 239 may be identified in response to distributed application 242A pushing an electronic offer (e.g., to establish a communication channel with distributed application 242B) to distributed application 242B. It may also be that application layer 218 identifies response information 239 in response to a module at message processor 208 requesting an electronic offer from a module at message processor 205. For example, response information 239 may be identified in response to distributed application 242B requesting that distributed application 242A issue an electronic offer to distributed application 242B. Since response information is identified at the application layer (as opposed to other lower layers 228), an application designer can have increased control over how a response is structured.

Step 313 also includes a corresponding act of sending an electronic response (act 308). Act 308 can include sending a schema-based electronic response that includes the identified response information. For example, as illustrated by Arrow 4 in FIG. 2, message processor 208 sends electronic message 232, which includes response information 239, to message processor 205. Message processor 208 can compose electronic message 232 to include response information 239 as well as other information for electronically negotiating properties of a communication channel. The routing path of electronic message 232 can be configured based on desired functionality. The routing path taken by electronic message 232 may or may not be the same as the routing path taken by electronic message 230. Message processor 208 may also compose electronic message 232 to include other types of information not related to the establishment of a communication channel along with response information 239.

The following represents an example XML counter offer element that may be included in the header and/or body of a SOAP envelope for representing a response to an offer:

```
1.    <CounterOffer Name = "..." Expires = "...">
2.       <Replaces Ref = "..."/>
3.       <Augments Ref = "..."/>
4.       <Reference Type = "..." Ref = "..."/>
5.       RESPONSE INFORMATION
6.    </CounterOffer>
```

Similar to the example XML offer element, sub-elements within the example XML counter offer element (between <CounterOffer> and </CounterOffer>) can include one more free-form XML documents and/or one or more XML documents that are defined in accordance with an XML schema. The use of schemas allows an application designer to flexibly define (or even re-define) how a counter offer is structured without having to redesign portions of a distributed application.

The example XML counter offer element includes a "Replaces" sub-element, an "Augments" sub-element, and a "Reference" sub-element. However, inclusion of all of these sub-elements within a SOAP envelope (or any other electronic message) is optional. Attributes in the example XML counter offer element can be part of a name-value pair, such as, for example, a name attribute and a corresponding name attribute value. Where an ellipsis appears, this indicates that attribute values corresponding to attributes can also be included in the example XML counter offer element.

Similar to the XML offer element, the example XML counter offer element includes a "Name" attribute (at line 1), which can be used to represent a descriptive name for the counter offer. Also similar to the example XML offer element, the example XML counter offer element also includes an "Expires" attribute, which can be used to represent a date and/or time after which the counter offer expires.

The Replaces sub-element (line 2) is an example of a sub-element that can be used to indicate that the Response Information at line 5 is to replace offer information referenced by the "Ref" attribute. A corresponding Ref attribute value can include a reference that is used to locate the other offer information that is to be replaced. The Ref attribute value may, for example, reference the example XML offer element.

The Augments sub-element (line 3) is an example of a sub-element that can be used to indicate that the Response Information at line 5 is to augment offer information referenced by the "Ref" attribute. A corresponding Ref attribute value can include a reference that is used to locate the other offer information that is to be augmented. The Ref attribute value may, for example, reference the example XML offer element.

The reference sub-element (line 4) is an example of a user-defined sub-element that can be used to define a specified relationship between the Response Information at line 5 and offer information referenced by the "Ref" attribute. A corresponding Ref attribute value can include a reference that is used to locate the other offer information. The "Type" attribute can be used to indicate the type of specified relationship. A corresponding Type attribute value can be an identifier (e.g., a name, a number, etc.) that identifies a type of specified relationship.

Response Information at line 5 can be response information (e.g., response information 239) that was identified by a message processor (e.g., message processor 208) for the purpose of electronically negotiating the properties of a communication channel with another message processor (e.g., message processor 205). Response information can be structured in accordance with an XML schema.

The following represents an example XML acceptance element that may be included in the header and/or body of a SOAP envelope for representing a response to an offer:

```
1.    <Accept Ref = ". . ."/>
2.        RESPONSE INFORMATION
3.    </Accept>
```

Similar to the example XML offer element, the example XML acceptance element (between <Accept> and </Accept>) can include one more free-form XML documents and/or one more XML documents that are defined in accordance with an XML schema. The use of schemas allows an application designer to flexibly define (or even re-define) how an acceptance is structured without having to redesign portions of a distributed application. Where an ellipsis appears, this indicates that attribute values corresponding to attributes can also be included in the example XML acceptance element.

The example XML acceptance element includes a "Ref" attribute. A corresponding Ref attribute value can include a reference that is used to locate offer information that is to be accepted. The Ref attribute value may, for example, reference the example XML offer element.

Response Information at line 2 can be response information (e.g., response information 239) that was identified by a message processor (e.g., message processor 208) for the purpose of electronically negotiating the properties of a communication channel with another message processor (e.g., message processor 205). Response information can be structured in accordance with an XML schema. Response information can indicate the portions of offer information from an electronic offer are to be accepted. It may be that response information indicates that some portions of offer information are to be accepted, while other portions of offer information are not to be accepted. It may also be that response information indicates that all of the offer information associated with an electronic offer is to be accepted.

The following represents an example of an XML rejection element that may be included in the header and/or body of a SOAP envelope for representing a response to an offer:

```
1.    <Reject Ref = ". . ."/>
2.        RESPONSE INFORMATION
3.    </Reject >
```

Similar to the example XML offer element, the example XML rejection element (between <Reject> and </Reject>) can include one more free-form XML documents and/or one more XML documents that are defined in accordance with an XML schema. The use of schemas allows an application designer to flexibly define (or even re-define) how a rejection is structured without having to redesign portions of a distributed application. Where an ellipsis appears, this indicates that attribute values corresponding to attributes can also be included in the example XML rejection element.

The example XML rejection element includes a "Ref" attribute. A corresponding Ref attribute value can include a reference that is used to locate offer information that is to be rejected. The Ref attribute value may, for example, reference the example XML offer element.

Response Information at line 2 can be response information (e.g., response information 239) that was identified by a message processor (e.g., message processor 208) for the purpose of electronically negotiating the properties of a communication channel with another message processor (e.g., message processor 205). Response information can be structured in accordance with an XML schema. Response information can indicate the portions of offer information from an electronic offer are to be rejected. It may be that response information indicates that some portions of offer information are to be rejected, while other portions of offer information are not to be rejected. It may also be that response information indicates that all of the offer information associated with an electronic offer is to be rejected.

The method 300 includes an act of the receiving message processor determining if electronic negotiations should continue (act 309). Act 309 can include determining if electronic negotiations between the receiving message processor and the initiating message processor should continue based on the schema-based electronic offer. For example, message processor 208 can determine whether or not to continue electronic negotiations with message processor 205 based on offer information 236. When message processor 208 accepts and/or rejects all portions of an electronic offer (e.g., all of offer information 236) from message processor 205, message processor 208 may determine that further electronic negotiations are not needed or are not appropriate. On the other hand, when message processor 208 neither accepts nor rejects all portions of an electronic offer from message processor 205, message processor 208 may determine that further electronic negations are appropriate. Similarly, when message processor 208 is to send a counter offer (e.g., including response information 239) to message processor 205, message processor 208 may determine that further electronic negations are appropriate.

The method 300 includes act of receiving an electronic response (act 303). Act 303 can include receiving a schema-based electronic response that includes response information identified by the receiving application layer. For example, as illustrated by Arrow 4 in FIG. 2, message processor 205 receives electronic message 232, which includes response information 239, from message processor 205.

The method in 300 includes an act of the initiating message processor determining if electronic negotiations should continue (act 304). Act 304 can include determining if electronic negotiations between the initiating message processor and the receiving message processor should continue based on the schema-based electronic response. For example, message processor 205 can determine whether or not to continue electronic negotiations with message processor 208. When an electronic response (e.g., including response information 239) indicates that all portions of an electronic offer (e.g., including offer information 236) have been accepted and/or rejected by message processor 208, message processor 205 may determine that further electronic negotiations are not need or are not appropriate. On the other hand, when an electronic response indicates that at least a portion of an electronic offer has not been accepted nor rejected by message processor 208, message processor 205 may determine that further negotiations are appropriate. Similarly, when an electronic response includes a counter offer from message processor 208, message processor 205 may determine that further negotiations are appropriate.

Method 300 includes an act of the initiating message processor establishing communication channel (act 305). Act 305 can include establishing a communication channel with the negotiated properties. For example, message processor 205 can establish a communication channel with message processor 208 that is configured based on the communication properties included in offer information 236 and/or response information 239. Method 300 includes an act of the receiving message processor establishing a communication channel (act 310). Act 310 can include establishing a communication channel with the negotiated properties. For example, message processor 208 can establish a communication channel with message processor 205 that is configured based on the communication properties included in offer information 236 and/or response information 239.

A communication channel can be established between portions of a distributed application at different message processors. For example, as depicted in FIG. 2, distributed application 242A and distributed application 242B can establish communication channel 247. A communication channel can be established when distributed application 242A accepts a portion of offer information (or possibly response information included in a counter offer) from distributed application 242B or vice versa. It should be understood that establishment of a one communication channel (or rejection of one portion of offer information) does not preclude the continuation of electronic negotiations for establishment of other communication channels.

Thus, in some embodiments, one or more of the acts 301-310 may be repeated. For example, electronic negations between message processor 205 and message processor 208 (or between any other message processors and/or computer systems) may include sending and receiving virtually any number of electronic offers and electronic responses. Each electronic offer or electronic response may include identified offer information, identified response information, an acceptance and/or rejection of portions offer information, as well as counter offers that augment or replace offer information. For example, a single electronic response can accept a first portion of offer information (e.g., by including an XML acceptance element), reject a second portion of offer information (e.g., by including an XML rejection element), and counter offer to augment a third portion of offer information (e.g., by including an XML counter offer element). Electronic offers and electronic responses can continue to be sent and received until either message processor 205 or message processor 208 determines that electronic negotiations are no longer appropriate.

It may be that a plurality of negotiations occurs simultaneously. For example, message processor 205 and message processor 208 may each include a plurality of distributed applications. Two or more of the distributed applications at message processor 205 can simultaneous negotiate communication properties (or other application layer properties) with two or more of the distributed applications at message processor 208. Offers, responses, and counter offers can be sent and received by any of the distributed applications at message processor 205 or message processor 208.

When a plurality of negotiations occurs simultaneously, each negotiation in the plurality of negotiations may be independent of the other negations in the plurality of navigations. For example, communication properties of separate communication channels may be negotiated independent of one another. On the other hand, when a plurality of negotiations occurs simultaneously one or more of the negotiations in the plurality of negotiations may depend on one or more other negations in the plurality of navigations. For example, negotiation of identity-based properties may depend on the existence of a communication channel between two message processors. When a negotiation depends on one or more other negotiations, appropriate offer, response, or counter offers can be transferred between message processors to indicate the dependencies.

In some embodiments, offer and/or response information is dependent on distributed application data. For example, a message processor may receive an electronic message including an offer element (e.g., in the header of the electronic message) and distributed application data indicating that the offer is from a premium customer (e.g., in the body of the electronic message). Based on the application data, the message processor may respond differently than the message processor would respond to non-premium customers. For example, the message processor may return response information indicating more favorable pricing or return response information with premium based content.

Figure 5:
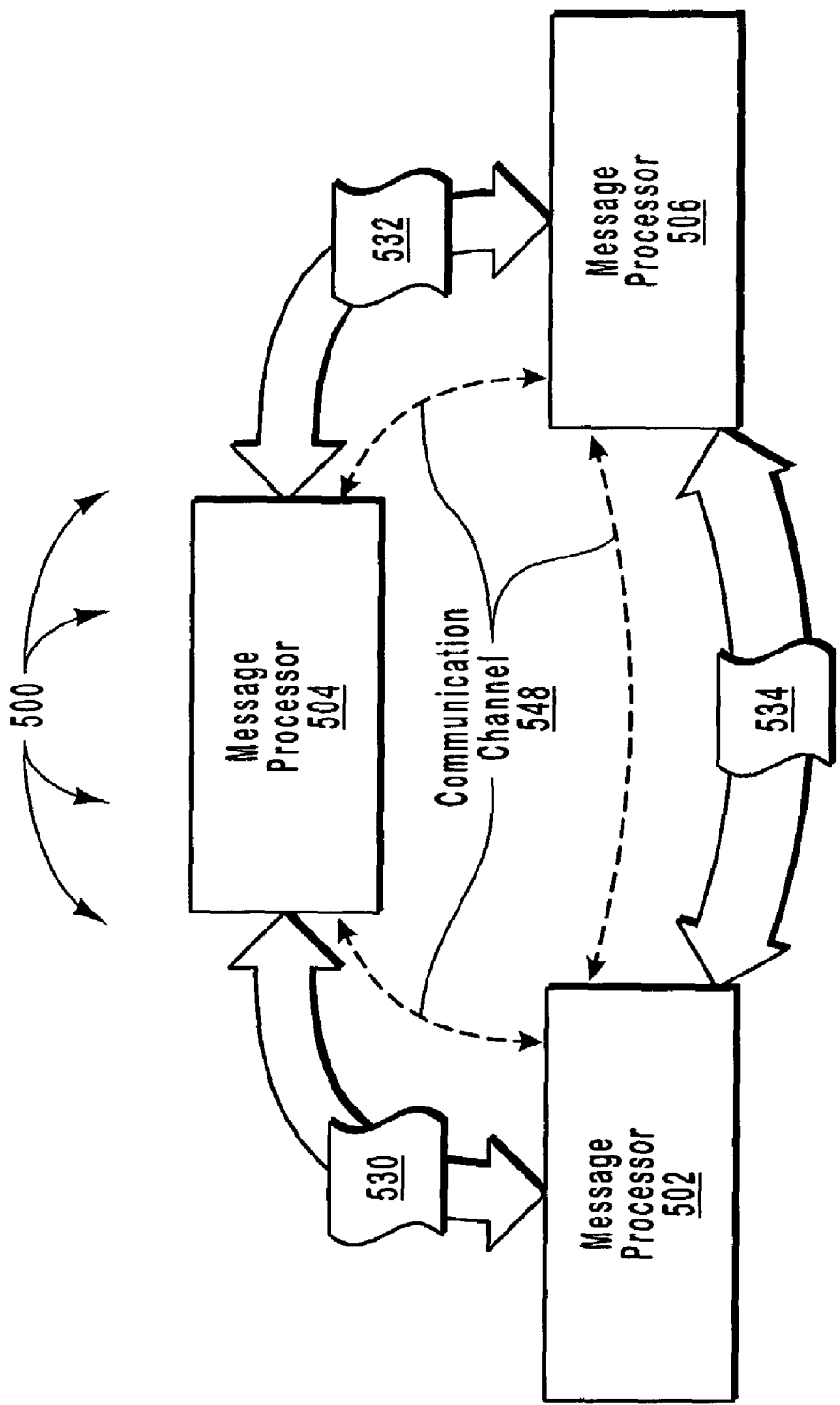
FIG. 5 illustrates an example of a network architecture that can facilitate electronically negotiating communication properties of a communication channel between three or more message processors.

In may be that communication properties of a communication channel are negotiated between three or more message processors. FIG. 5, illustrates an example of network architecture 500 that can facilitate electronic negotiation of properties of a communication channel between three or more message processors. Messages 530, 532, and 534 illustrate generally that offer information and response information are sent and received among message processors 502, 504, and 506. When a plurality of message processors accepts a portion of offer information from another message processor, a communication channel can be established. For example, message processors 504 and 506 may accept a portion of offer information from message processor 502 to establish communication channel 548.

It should be understood that although network architecture 500 illustrates three message processors (message processors 502, 504, and 506), the principles of the present are scalable to any number of message processors. For example, message processors 502, 504, and 506 may exchange offer information and response information with other message processors (not shown) that are external to network architecture 500. If one or more of these external message processors accepts a portion of offer information, communication channel 548 may be scaled to include the one or more external message processors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed system including an initiating message processor that is communicatively coupled to one or more other message processors such that the initiating message processor and the one or more other message processors can communicate by transferring electronic messages, a method for the initiating message processor to electronically negotiate properties of a communication channel with at least one of the other message processors, the method comprising:

an act of identifying a type of content that is to be transferred between an initiating message processor and a receiving message processor, wherein the initializing message processor and receiving message processor each include a communication stack having an application layer and one or more lower layers, wherein identifying the type of content is performed upon establishing communication properties of a communication channel between an initiating application layer and a receiving application layer of the initiating message processor and the receiving message processor, respectively;

based on the identified type of content, an act of identifying offer information that is included into an initial schema-based electronic offer that is to be used to electronically negotiate properties of a communication channel with the initiating application layer and the receiving application layer in order to identify an intersection of mutually supported communication options suitable for transporting the type of content identified, and by prioritizing communication options specified by a designer of a distributed application corresponding to the initializing application layer and receiving application layer over communication options for the one or more lower layers of the communication stack;

an act of sending the initial schema-based electronic offer from the initiating application layer that includes the identified offer information to the receiving message processor, wherein sending the initial schema-based electronic offer includes sending a SOAP message using one or more lower-level protocols, with a header and/or body of the SOAP message including a schema-based document as the electronic offer;

an act of receiving a schema-based electronic response that includes response information identified by the receiving application layer, the response information indicating a position of the receiving message processor with respect to the initial schema-based electronic offer;

an act of determining whether electronic negotiations between the initiating message processor and the receiving message processor should continue based on the schema-based electronic response;

an act of sending a second offer that includes a schema-based document, the schema-based document of the second offer including:

a specification of a descriptive name for an offer in a form of a name attribute/value pair;

an expires attribute value within the name attribute/value pair, and specifying a time and/or date value representing a time after which the second offer expires;

an offer information element including descriptive information about the offer;

at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and a reference sub-element defining a relationship between the descriptive information in the offer information element and other information referenced by the reference sub-element, the reference sub-element further including a reference used to locate other offer information and a type attribute/value pair identifying a type of specified relationship; and concluding negotiations between the initializing message processor and receiving message processor as soon as the communication properties of the communication channel with the initiating application layer and the receiving application layer are mutually agreed upon.

2. The method as recited in claim 1, wherein the act identifying offer information that is to be used to electronically negotiate properties of a communication channel comprises an act of identifying offer information from a database of communication properties, which include one or more protocols, packet format, security properties, encryption types, authentication, reliable messaging properties, transactional properties, language properties, or expiration properties.

3. The method as recited in claim 1, wherein the act identifying offer information that is to be used to electronically negotiate properties of a communication channel comprises an act of identifying offer information in response to a first portion of a distributed application at the initiating message processor indicating a desire to communicate with a second portion of the distributed application at the receiving message processor.

4. The method as recited in claim 1, wherein the act of sending the initial schema-based electronic offer that includes the identified offer information comprises an act of sending an electronic offer defined in accordance with an XML schema.

5. The method as recited in claim 1, wherein the act of sending the initial schema-based electronic offer that includes the identified offer information comprises an act of sending a SOAP envelope.

6. The method as recited in claim 1, wherein the act of sending the initial schema-based electronic offer that includes the identified offer information comprises an act of including the schema based offer in the header portion of an electronic message along with application data in the body of the electronic message.

7. The method as recited in claim 1, wherein the act of receiving a schema-based electronic response that includes response information comprises an act of receiving response information indicating that electronically negotiating the properties of the communication channel is dependent on the results of one or more other negotiations.

8. The method as recited in claim 1, further comprising:
an act of configuring a communication channel according to the negotiated properties.

9. A method as recited in claim 1, wherein the communication stacks are based around an Open Systems Interconnection (OSI) networking framework, the schema-based document of the initial schema-based electronic offer is an XML document, the schema-based document of the second offer is an XML document, and the second offer includes both the replaces sub-element and the augments sub-element.

10. In a distributed system including a initiating message processor that is communicatively coupled to one or more other message processors such that the initiating message processor and the one or more other message processors can communicate by transferring electronic messages, a method for the initiating message processor to electronically negotiate properties of a communication channel with at least one of the other message processors, the method comprising:

a step for issuing an initial schema-based electronic offer, which includes negotiation properties of supported communication options selected for the initial offer based on a type of content that is to be transferred between an initiating message processor and a receiving message processor upon establishing communication properties of a communication channel between an initiating application layer and a receiving application layer of the initiating message processor and the receiving message processor, respectively, the initial offer issued in order to identify an intersection of mutually supported communication options suitable for transporting the type of content identified, and with priority given to communication options specified by a designer of a distributed application corresponding to the initiating application layer and receiving application layer over communication options of communication stacks that includes, at the initiating message processor, the initiating application layer and one or more lower layers, and at the receiving message processor, the receiving message layer and one or more lower layers, the issued initial offer including a SOAP message sent using one or more lower-level protocols, with a header and/or body of the SOAP message further including a schema-based document as the electronic offer;

an act of receiving a schema-based electronic response that includes response information identified by a receiving application layer, the response information indicating a position of the receiving message processor with respect to the initial schema-based electronic offer;

an act of determining whether electronic negotiations between the initiating message processor and the receiving message processor should continue based on the schema-based electronic response; and an act of issuing a second offer that includes a schema-based document, the schema-based document of the second offer including:
  a specification of a descriptive name for an offer in a form of a name attribute/value pair;
  an expires attribute value within the name attribute/value pair, and specifying a time and/or date value representing a time after which the second offer expires;
  an offer information element including descriptive information about the offer;
  at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and
  a reference sub-element defining a relationship between the descriptive information in the offer information element and other information referenced by the reference sub-element, the reference sub-element further including a reference used to locate other offer information and a type attribute/value pair identifying a type of specified relationship; and
  concluding negotiations between the initializing message processor and receiving message processor as soon as the communication properties of the communication channel with the initiating application layer and the receiving application layer are mutually agreed upon.

11. In a distributed system including a receiving message processor that is communicatively coupled to one or more other message processors such that the receiving message processor and the one or more other message processors can communicate by transferring electronic messages, a method for the receiving message processor to electronically negotiate properties of a communication channel with at least one of the other message processors, the method comprising:

an act of receiving an initial schema-based electronic offer that includes offer information identified by an initiating application layer at an initiating message processor, wherein the offer information includes negotiation properties of a communication channel chosen based on a type of content that is to be transferred between the initiating message process and a receiving message processor upon establishing communication properties of a communication channel between an initiating application layer and a receiving application layer of the initiating message processor and the receiving message processor, respectively, the initial offer received in order to identify an intersection of mutually supported communication options suitable for transporting the type of content identified, wherein the received initial offer includes receiving a SOAP message sent using one or more lower-level protocols, with a header and/or body of the SOAP message including a schema-based document as the electronic offer;

prioritizing communication options specified by a designer of a distributed application corresponding to the initializing application layer and receiving application layer over communication options for one or more lower layers of communication stacks at the initiating message processor and the receiving message processor;

based on the received initial schema-based electronic offer, an act of identifying response information at the receiving application layer that is to be used to electronically negotiate properties for a communication channel;

an act of sending a schema-based electronic response that includes the identified response information to the initiating message processor;

an act of determining whether electronic negotiations between the receiving message processor and the initiating message processor should continue based on the initial schema-based electronic offer;

an act of determining that negotiations should continue;

an act of receiving a second offer that includes a schema-based document, the schema-based document of the second offer including:
  a specification of a descriptive name for an offer in a form of a name attribute/value pair;
  an expires attribute value within the name attribute/value pair, and specifying a time and/or date value representing a time after which the second offer expires;
  an offer information element including descriptive information about the offer;
  at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and
  a reference sub-element defining a relationship between the descriptive information in the offer information element and other information referenced by the reference sub-element, the reference sub-element further including a reference used to locate other offer information and a type attribute/value pair identifying a type of specified relationship; and
  concluding negotiations between the initializing message processor and receiving message processor as soon as the communication properties of the communication channel with the initiating application layer and the receiving application layer are mutually agreed upon.

12. The method as recited in claim 11, wherein the act of identifying response information that is to be used to electronically negotiate properties for a communication channel comprises an act of identifying response information from a database of communication properties, which include one or more protocols, packet format, security properties, encryption types, authentication, reliable messaging properties, transactional properties, language properties, or expiration properties.

13. The method as recited in claim 11, wherein the act of identifying response information that is to be used to electronically negotiate properties for a communication channel comprises an act of a second portion of a distributed application at the receiving message processor indicating a desire to communicate with a first portion of a distributed application at the initiating message processor.

14. The method as recited in claim 11, wherein the act of identifying response information that is to be used to electronically negotiate properties for a communication channel comprises an act of identifying response information that rejects at least a portion of the schema-based electronic offer.

15. The method as recited in claim 11, wherein the act of identifying response information that is to be used to electronically negotiate properties for a communication channel comprises an act of identifying response information that accepts at least a portion of the schema-based electronic offer.

16. The method as recited in claim 11, wherein the act of identifying response information that is to be used to electronically negotiate properties for a communication channel comprises an act of identifying response information that is to augment at least a portion of the schema-based electronic offer.

17. The method as recited in claim 11, wherein the act of identifying response information that is to be used to electronically negotiate properties for a communication channel comprises an act of identifying response information that is to replace at least a portion of the schema-based electronic offer.

18. The method as recited in claim 11, wherein the act of sending a schema-based electronic response that includes the identified response information comprises an act of sending an electronic response in accordance with an XML schema.

19. The method as recited in claim 11, wherein the act of sending a schema-based electronic response that includes the identified response information comprises an act of sending a SOAP envelope.

20. The method as recited in claim 11, wherein the act of sending a schema-based electronic response that includes the identified response information comprises an act of sending the schema-based electronic response in the header of an electronic message along with application data in the body of the electronic message.

21. The method as recited in claim 11, wherein the act of sending a schema-based electronic response that includes the identified response information comprises an act of sending a schema-based electronic response indicating that electronically negotiating properties of the communication channel is dependent on the results of one or more other negotiations.

22. The method as recited in claim 11, further comprising: an act of configuring a communication channel according to the negotiated properties.

23. In a distributed system including a receiving message processor that is communicatively coupled to one or more other message processors such that the receiving message processor and the one or more other message processors can communicate by transferring electronic messages, a method for the receiving message processor to electronically negotiate a properties of a communication channel with at least one of the other message processors, the method comprising:

a step for responding to an initial schema-based electronic offer, which includes negotiation properties of supported communication options selected for the initial offer based on a type of content that is to be transferred between an initiating message processor and a receiving message processor upon establishing communication properties of a communication channel between an initiating application layer and a receiving application layer of the initiating message processor and the receiving message processor, respectively, the initial offering received in order to identify an intersection of mutually supported communication options suitable for transporting the type of content identified, wherein the received initial offer includes receiving a SOAP message sent using one or more lower-level protocols, with a header and/or body of the SOAP message including a schema-based document as the electronic offer;

prioritizing communication options specified by a designer of a distributed application corresponding to the initializing application layer and receiving application layer over communication options for one or more lower layers of communication stacks at the initiating message processor and the receiving message processor;

an act of determining whether electronic negotiations between the receiving message processor and the initiating message processor should continue based on the schema-based electronic offer;

an act of determining that electronic negotiations should continue;

an act of responding to a second offer that includes a schema-based document, the schema-based document of the second offer including:
　a specification of a descriptive name for an offer in a form of a name attribute/value pair;
　an expires attribute value within the name attribute/value pair, and specifying a time and/or date value representing a time after which the second offer expires;
　an offer information element including descriptive information about the offer;
　at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and
　a reference sub-element defining a relationship between the descriptive information in the offer information element and other information referenced by the reference sub-element, the reference sub-element further including a reference used to locate other offer information and a type attribute/value pair identifying a type of specified relationship; and concluding negotiations between the initializing message processor and receiving message processor as soon as the communication properties of the communication channel with the initiating application layer and the receiving application layer are mutually agreed upon.

24. A computer program product for use in a distributed system including a initiating message processor that is communicatively coupled to one or more other message processors such that the initiating message processor and the one or more other message processors can communicate by transferring electronic messages, the computer program product for implementing a method for the initiating message processor to electronically negotiate a properties of a communication channel with at least one of the other message processors, the computer program product comprising one or more computer-readable storage hardware devices having stored thereon the following:

computer-executable instructions for identifying a type of content that is to be transferred between an initiating message processor and a receiving message processor, wherein the initializing message processor and receiving message processor each include a communication stack having an application layer and one or more lower layers, wherein identifying the type of content is performed upon establishing communication properties of a communication channel between an initiating application layer and a receiving application layer of the initiating message processor and the receiving message processor, respectively;

based on the identified type of content, computer-executable instructions for identifying offer information that is included in an initial schema-based electronic offer that is to be used to electronically negotiate a properties of a communication channel with the initiating application layer and the receiving application layer at a receiving message processor in order to identify an intersection of mutually supported communication options suitable for transporting the type of content identified, and by prioritizing communication options specified by a designer of a distributed application corresponding to the initializing application layer and receiving application layer over communication options for the one or more lower layers of the communication stack;

computer-executable instructions for sending the initial schema-based electronic offer that includes the identified offer information to the receiving message processor, wherein sending the initial schema-based electronic offer includes sending a SOAP message using one or more lower-level protocols, with a header and/or body of the SOAP message including a schema-based document as the electronic offer;

computer-executable instructions for receiving a schema-based electronic response that includes response information identified by the receiving application layer, the response information indicating a position of the receiving message processor with respect to the initial schema-based electronic offer;

computer-executable instructions for determining whether electronic negotiations between the initiating message processor and the receiving message processor should continue based on the schema-based electronic response;

computer-executable instructions for determining that electronic negotiations should continue;

computer-executable instructions for sending a second offer that includes a schema-based document, the schema-based document of the second offer including:

a specification of a descriptive name for an offer in a form of a name attribute/value pair;

an expires attribute value within the name attribute/value pair, and specifying a time and/or date value representing a time after which the second offer expires;

an offer information element including descriptive information about the offer;

at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and a reference sub-element defining a relationship between the descriptive information in the offer information element and other information referenced by the reference sub-element, the reference sub-element further including a reference used to locate other offer information and a type attribute/value pair identifying a type of specified relationship; and concluding negotiations between the initializing message processor and receiving message processor as soon as the communication properties of the communication channel with the initiating application layer and the receiving application layer are mutually agreed upon.

25. A computer program product for use in a distributed system including a receiving message processor that is communicatively coupled to one or more other message processors such that the receiving message processor and the one or more other message processors can communicate by transferring electronic messages, the computer program product for implementing a method for the receiving message processor to electronically negotiate a properties of a communication channel with at least one of the other message processors, the computer program product comprising one or more computer-readable storage hardware devices having stored thereon the following:

computer-executable instructions for receiving an initial schema-based electronic offer that includes offer information identified by an initiating application layer at an initiating message processor, wherein the offer information includes negotiation properties of a communication channel chosen based on a type of content that is to be transferred between the initiating message processor and a receiving message processor upon establishing communication properties of a communication channel between an initiating application layer and a receiving application layer of the initiating message processor and the receiving message processor, respectively, the initial offer received in order to identify an intersection of mutually supported communication options suitable for transporting the type of content identified, wherein the received initial offer includes receiving a SOAP message sent using one or more lower-level protocols, with a header and/or body of the SOAP message including a schema-based document as the electronic offer;

computer-executable instructions for prioritizing communication options specified by a designer of a distributed application corresponding to the initializing application layer and receiving application layer over communication options for one or more lower layers of communication stacks at the initiating message processor and the receiving message processor;

computer-executable instructions for, based on the received initial schema-based electronic offer, identifying response information at the receiving application layer that indicates a position of the receiving message processor with respect to the schema-based electronic offer;

computer-executable instructions for sending a schema-based electronic response that includes the identified response information to the initiating message processor;

computer-executable instructions for determining whether electronic negotiations between the receiving message processor and the initiating message processor should continue based on the schema-based electronic offer;

computer-executable instructions for receiving a second offer that includes a schema-based document, the schema-based document of the second offer including:

a specification of a descriptive name for an offer in a form of a name attribute/value pair;

an expires attribute value within the name attribute/value pair, and specifying a time and/or date value representing a time after which the second offer expires;

an offer information element including descriptive information about the offer;

at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and a reference sub-element defining relationship between the descriptive information in the offer information element and other information referenced by the reference sub-element, the reference sub-element further including a reference used to locate other offer information and a type attribute/value pair identifying a type of specified relationship; and concluding negotiations between the initializing message processor and receiving message processor as soon as the communication properties of the communication channel with the initiating application layer and the receiving application layer are mutually agreed upon.

26. In a distributed system including a initiating message processor that is communicatively coupled to one or more other message processors such that the initiating message processor and the one or more other message processors can communicate by transferring electronic messages, a method of conserving message processor resources and network bandwidth when negotiating properties of a communication channel with at least one of the other message processors, the method comprising:

a step for issuing an initial schema-based electronic offer, which includes negotiation properties of supported communication options selected for the initial offer based on a type of content that is to be transferred between an initiating message processor and a receiving message processor upon establishing communication properties of a communication channel in order to identify an intersection of mutually supported communication options suitable for transporting the type of content identified, wherein communication options specified by a designer of a distributed application corresponding to an initiating application layer and a receiving application layer of the initiating message processor and receiving message processor, respectively, are given priority over lowers of communication stacks of the initiating message processor and receiving message processor, respectively, the issued initial offer including a SOAP message sent using one or more lower-level protocols, with a header and/or body of the SOAP message further including a schema-based document as the electronic offer;

an act of receiving a schema-based electronic response that includes response information identified by the receiving message processor, wherein the initial schema-based electronic offer, the schema-based electronic response, or both, includes other types of information not related to the establishment of the communication channel in order to reduce the overhead associated with composing and transferring a separate electronic message to contain the other types of information;

an act of determining whether electronic negotiations between the initiating message processor and the receiving message processor should continue based on the schema-based electronic response, and wherein if the schema-based electronic response includes the other types of information, the method further includes processing the other types of information regardless of the determination of the continuation of electronic negotiation;

an act of issuing a second offer that includes a schema-based document, the schema-based document of the second offer including:

a specification of a descriptive name for an offer in a form of a name attribute/value pair;

an expires attribute value within the name attribute/value pair, and specifying a time and/or date value representing a time after which the second offer expires;

an offer information element including descriptive information about the offer;

at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and a reference sub-element defining a relationship between the descriptive information in the offer information element and other information referenced by the reference sub-element, the reference sub-element further including a reference used to locate other offer information and a type attribute/value pair identifying a type of specified relationship; and concluding negotiations between the initializing message processor and receiving message processor as soon as the communication properties of the communication channel with the initiating application layer and the receiving application layer are mutually agreed upon.

27. In a distributed system including a initiating message processor that is communicatively coupled to one or more other message processors such that the initiating message processor and the one or more other message processors can communicate by transferring electronic messages, a method of simultaneously conducting a plurality of negotiations that each depend on one another for establishing properties of a communication channel with at least one of the other message processors, the method comprising:

a step for issuing an initial schema-based electronic offer, which includes negotiation properties of supported communication options selected for the initial offer based on a type of content that is to be transferred between an initiating message processor and a receiving message processor, the initial offer issued in order to begin a first negotiation process that identifies an intersection of mutually supported communication options suitable for transporting the type of content identified, and by prioritizing communication options specified by a designer of a distributed application corresponding to the initializing application layer and receiving application layer over communication options for the one or more lower layers of the communication stack, the issued initial offer including a SOAP message sent using one or more lower-level protocols, with a header and/or body of the SOAP message further including a schema-based document as the electronic offer and including:

a specification of a descriptive name for an offer in a form of a name attribute/value pair;

an expires attribute value within the name attribute/value pair, and specifying a time and/or date value representing a time after which the initial offer expires;

an offer information element including descriptive information about the offer;

at least one of a replaces sub-element indicating that descriptive information in the offer information element is to replace other offer information referenced by the replaces sub-element, or an augments sub-element indicating that the descriptive information in the offer information element augments other offer information referenced by the augments sub-element; and a reference sub-element defining a relationship between the descriptive information in the offer information element and other information referenced by the reference sub-element, the reference sub-element further including a reference used to locate other offer information and a type attribute/value pair identifying a type of specified relationship;

an act of receiving a schema-based electronic response that includes response information, which indicates a position of the receiving message processor with respect to the initial schema-based electronic offer of the first negotiation process;

based on an indication within the initial schema-based electronic offer, the schema-based electronic response, or both, determining that the first negotiation process depends on one or more other negotiations processes simultaneously being conducted therewith;

an act of determining whether electronic negotiations between the initiating message processor and the receiving message processor should continue based on the schema-based electronic response and based on results received for the one or more other negotiation processes; and concluding negotiations between the initializing message processor and receiving message processor as soon as the communication properties of the communication channel with the initiating application layer and the receiving application layer are mutually agreed upon.

\* \* \* \* \*